Oct. 11, 1960 — L. R. HEPLER ET AL — 2,955,721
DEVICE FOR INDUSTRIAL TRUCK
Filed Jan. 28, 1957 — 11 Sheets-Sheet 1

INVENTORS.
LEON R. HEPLER
GLENN JOHNSON JR.
ATTY.

Oct. 11, 1960    L. R. HEPLER ET AL    2,955,721
DEVICE FOR INDUSTRIAL TRUCK
Filed Jan. 28, 1957    11 Sheets-Sheet 5

INVENTORS.
LEON R. HEPLER
GLENN JOHNSON JR.
BY
ATTY.

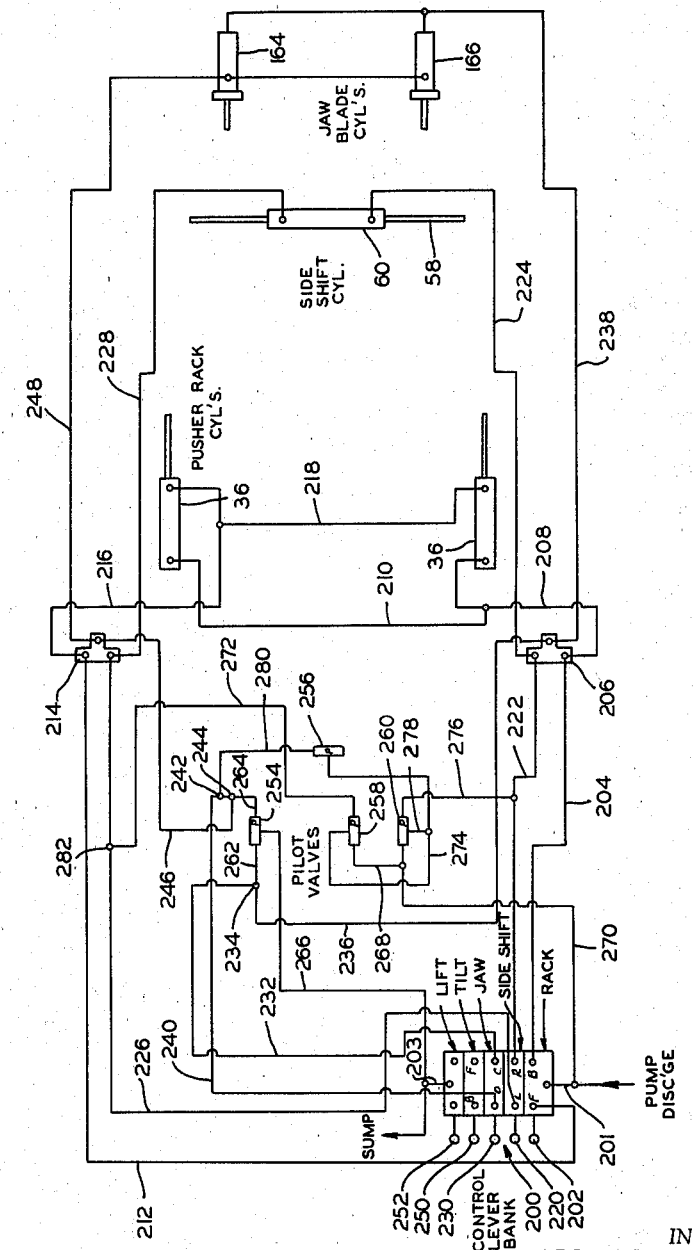

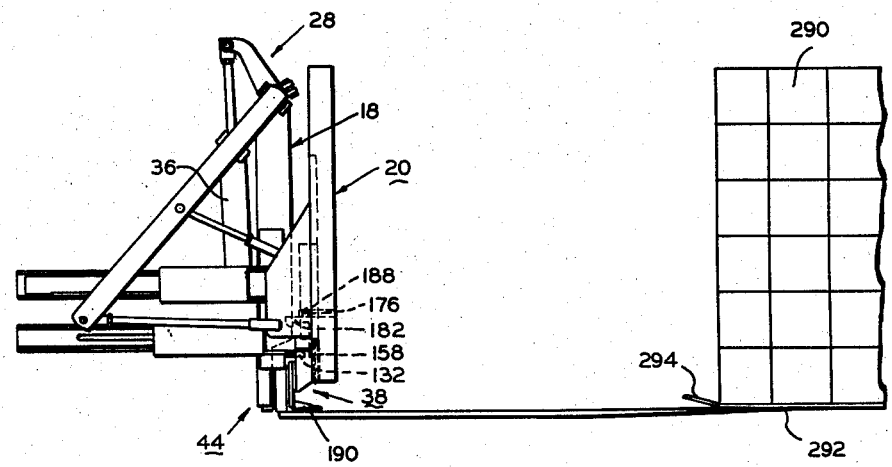
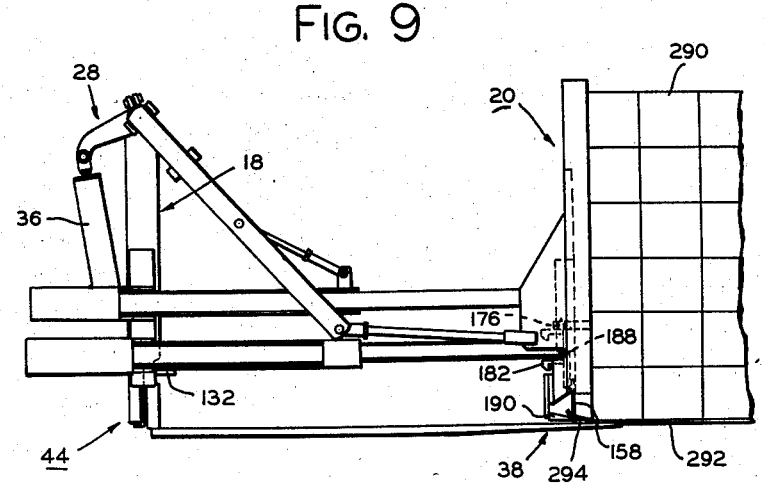

Oct. 11, 1960        L. R. HEPLER ET AL        2,955,721
DEVICE FOR INDUSTRIAL TRUCK
Filed Jan. 28, 1957                           11 Sheets-Sheet 8

INVENTORS.
LEON R. HEPLER
GLENN JOHNSON JR.
BY
ATTY.

Oct. 11, 1960  L. R. HEPLER ET AL  2,955,721
DEVICE FOR INDUSTRIAL TRUCK
Filed Jan. 28, 1957  11 Sheets-Sheet 10

INVENTORS.
LEON R. HEPLER
GLENN JOHNSON JR.
BY
ATTY.

INVENTORS.
LEON R. HEPLER
GLENN JOHNSON JR.

United States Patent Office 2,955,721
Patented Oct. 11, 1960

2,955,721
DEVICE FOR INDUSTRIAL TRUCK

Leon R. Hepler and Glenn Johnson, Jr., Battle Creek, Mich., assignors to Clark Equipment Company, a corporation of Michigan Filed Jan. 28, 1957, Ser. No. 636,682
24 Claims. (Cl. 214—514)

Our invention relates generally to an attachment for industrial trucks and more particularly to an attachment which is adapted to draw a sheet-like pallet on which a load is disposed onto a load supporting member of the truck and to push the load off of said member, together with improved means for retaining the pallet on the load supporting member when the load is discharged therefrom.

The present invention constitutes an improvement on the devices disclosed in George L. Turner's Patents Nos. 2,583,977 and 2,640,611, granted January 29, 1952 and June 2, 1953, respectively.

In some handling operations of material on a sheet-like pallet the hander may desire to retain the pallet and to discharge the load from the pallet and the load supporting surface of the industrial truck. An example of such is when the load is discharged into a boxcar, truck or the like for transport to a distant destination.

It is a primary object of the present invention to provide improved means whereby a sheet-like pallet and load may be together drawn onto the load supporting surface of an industrial truck and the load thereafter separated from the pallet during discharge thereof from the load supporting surface, the pallet being retained on said supporting surface.

It is a further object of the invention to provide improved mechanism for handling material in the above noted manner.

It is another object of the invention to provide control means for the pallet retaining mechanism whereby the operator is enabled to selectively retain the pallet on the load supporting surface or to discharge it therefrom with the load.

It is another important object of the invention to provide improved mechanism which is selectively operable remotely by the operator to combine the functions of drawing onto the load supporting surface of an industrial truck a sheet-like pallet and load, and of effecting retention of the pallet on the load supporting surface while permitting discharge of the load from the pallet and truck, or, alternatively, to discharge the pallet from the load supporting surface with the load.

It is yet another object of the present invention to provide means for shifting laterally the load supporting surface of an industrial truck in combination with improved mechanism for handling material as aforesaid, and control means adapted to automatically release a pallet retaining device of said mechanism whenever the load supporting surface is actuated transversely of said mechanism.

Other objects, uses, and advantages of our invention will become apparent from the following description when taken in conjunction with the accompanying drawings in which:

Figure 7 is a schematized diagram of hydraulic control circuitry for operating the device of our invention;

Figure 12:
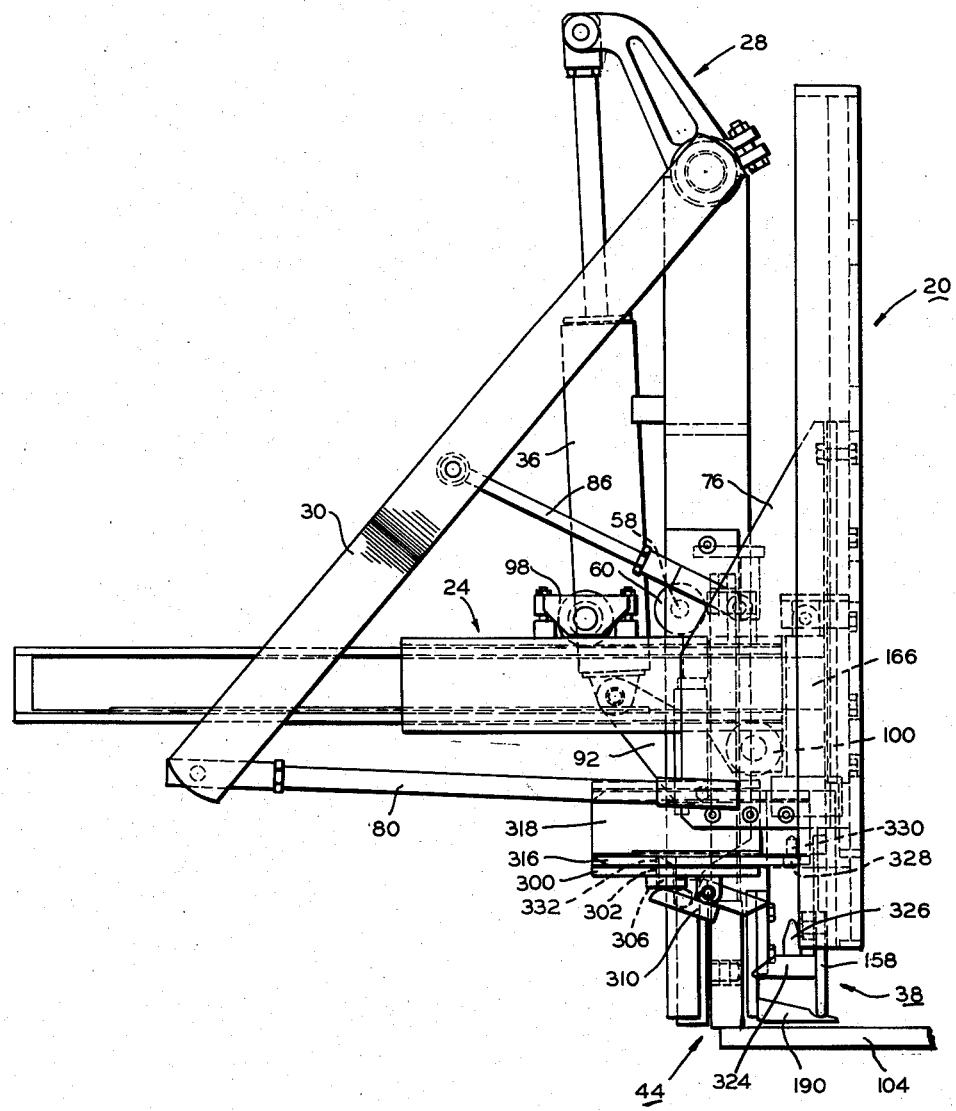
Figure 13:
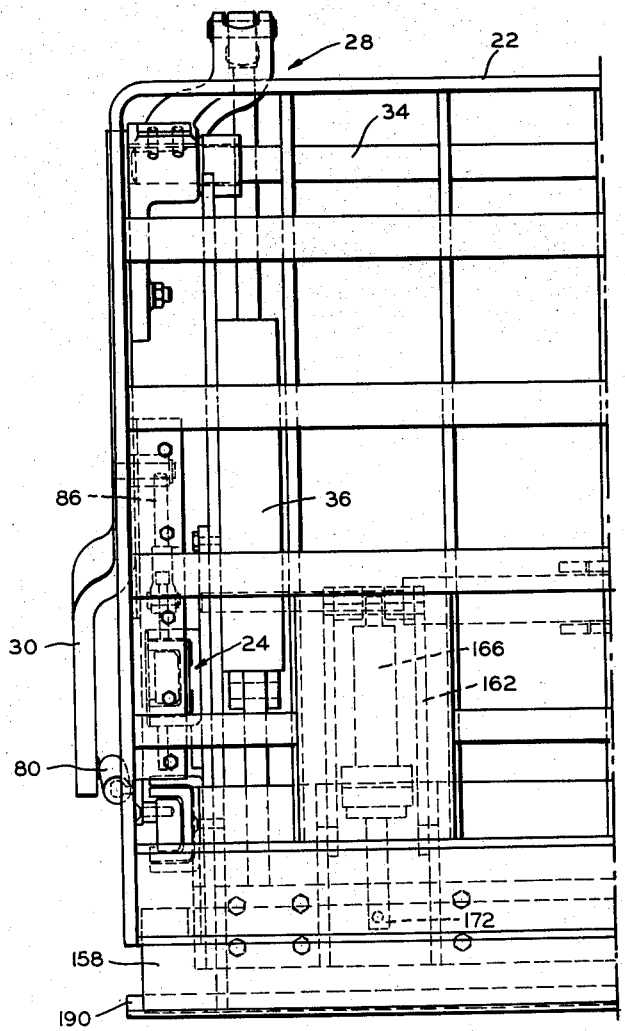
Figure 14:
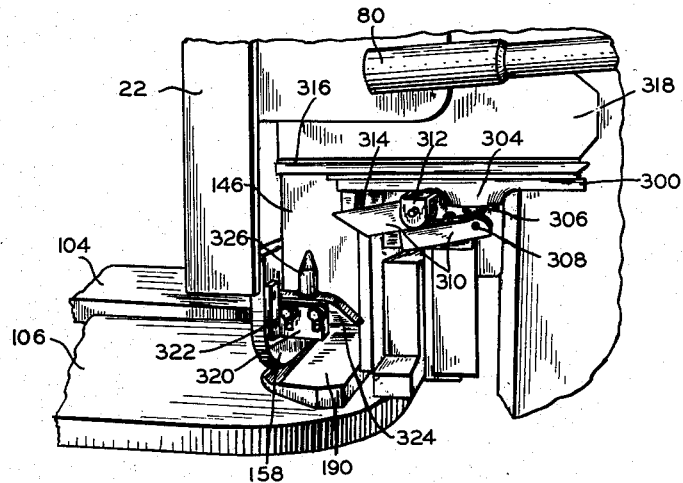
Figure 15:
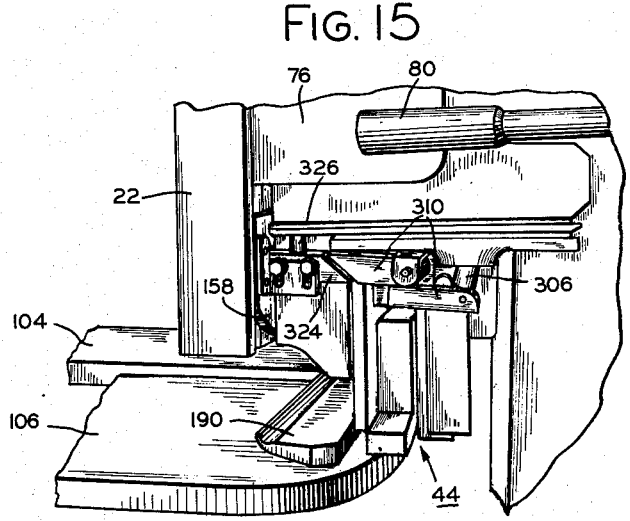

Figures 8, 9, 10 and 11 comprise a series of schematics which show a normal sequence of operation of the device shown in Figures 1–6;

Figure 12 is a side elevational view of a modified version of the device shown in Figures 1–6;

Figure 13 is a partial front elevational view of the device shown in Figure 12; and Figures 14 and 15 are perspective views of two different operating positions of the modified arrangements shown in Figures 12 and 13.

In carrying out this invention we provide essentially a load supporting means and a load pusher device which is supported by the load supporting means and which is adapted to be actuated longitudinally in either direction of the load supporting means with or separate from a clamping jaw mechanism. The clamping jaw mechanism is so constructed as to be alternately and selectively connected to the load pusher and to the load supporting means such that it may first be actuated outwardly of the supporting means with the pusher rack to engage the marginal edge of a sheet-like pallet upon which is disposed a load, and then actuated rearwardly with the pusher rack to draw the load and pallet upon the supporting means, following which the pusher rack may be again actuated outwardly of the supporting means while the clamping jaw mechanism remains in its rearward or clamping position thereby permitting the load to be pushed off the pallet and supporting means by the rack while the pallet is retained upon the supporting means by the clamping jaw mechanism. Alternatively, the clamping jaw mechanism when in its rearward position may be actuated from its connection with the supporting means to connection with the load pusher, whereupon subsequent actuation of the load pusher outwardly of the supporting means will effect like movement of the clamping means and a discharge from the supporting means of both the load and the sheet-like pallet.

In addition to the above, hydraulic control means is provided for permitting remote operator control of all movements of the various parts of our device for carrying out the foregoing sequence of operation, including automatically operable means which actuates the clamping jaw mechanism out of gripping relation to the sheet-like pallet whenever the operator initiates lateral shifting movement in either direction of a portion of the load supporting means.

Referring now to detail to the drawings and first to Figures 1–6, the forward end of an industrial lift truck of known construction is shown generally at numeral 10 and, as shown, comprises known telescoping lifting mast construction 12 which is pivotally mounted for tilting movement in a fore and aft direction about the housing of a front drive axle, not shown, which axle drives a pair of traction wheels, one of which is shown at 14.

The device of our invention is shown generally at numeral 16 and, as illustrated, comprises an attachment device of the truck 10. The device comprises generally a rectangular and vertically extending supporting framework 18 which is adapted to be elevated relative to the lifting mast 12 in a manner to be described; a load pusher assembly 20 which includes a transversely extending rack member 22 connected to the supporting frame assembly 18 by means of a pair of longitudinally and laterally spaced telescoping channel assemblies 24 and 26 for fore and aft movement, and connected to a power actuated crank assembly 28 which includes a pair of laterally spaced crank arms 30 and 32 rotatably actuatable in either direction with a connecting shaft 34 upon energization of a pair of laterally spaced hydraulic cylinder assemblies, one of which is shown at numeral 36, connected to said shaft 34 adjacent opposite ends thereof; a generally L-shaped load supporting assembly 44 which includes the framework 18 and a lifting carriage which is mounted for vertical movement in lifting mast 12; and a jaw and jaw frame assembly or clamping means 38 which is selectively connectible either to the load pusher device 20 or to the load supporting assembly 44 or truck frame and which is also continuously connected to the framework 18 by means of a pair of longitudinally extending and laterally spaced telescoping channel assemblies 40 and 42.

Figure 3:
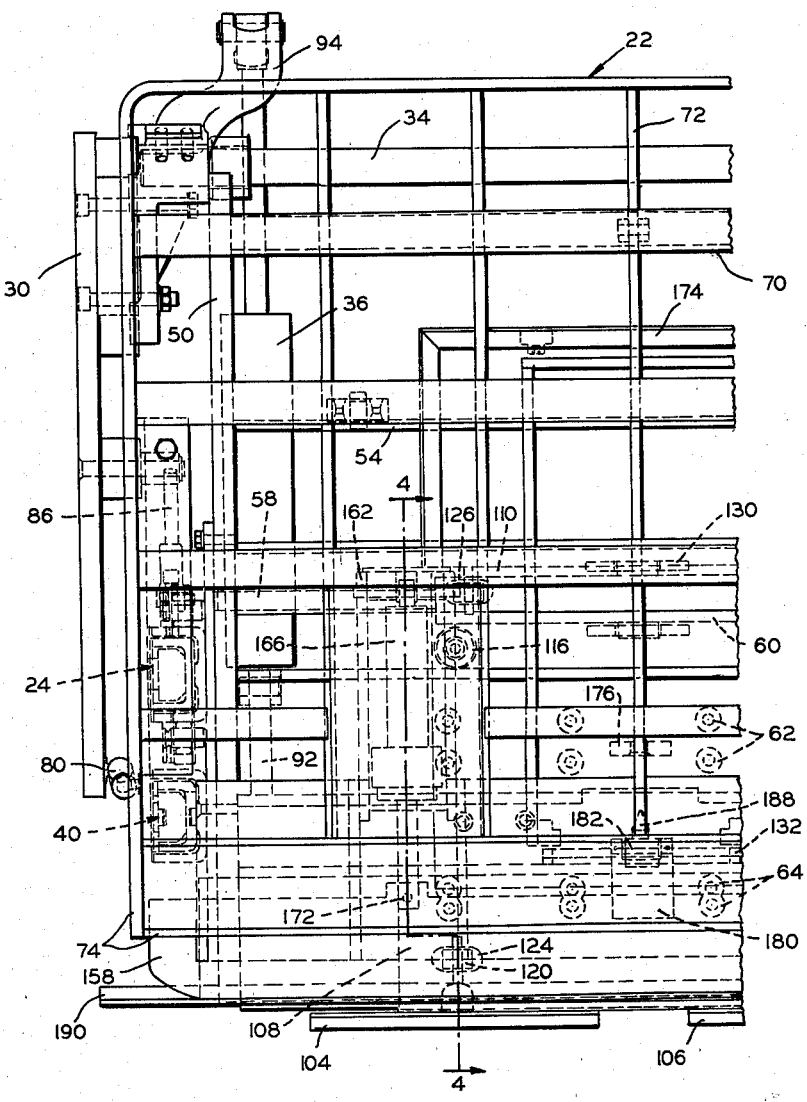
Figure 3 is a partial front elevational view of the device as shown in Figure 2.
Figure 4:
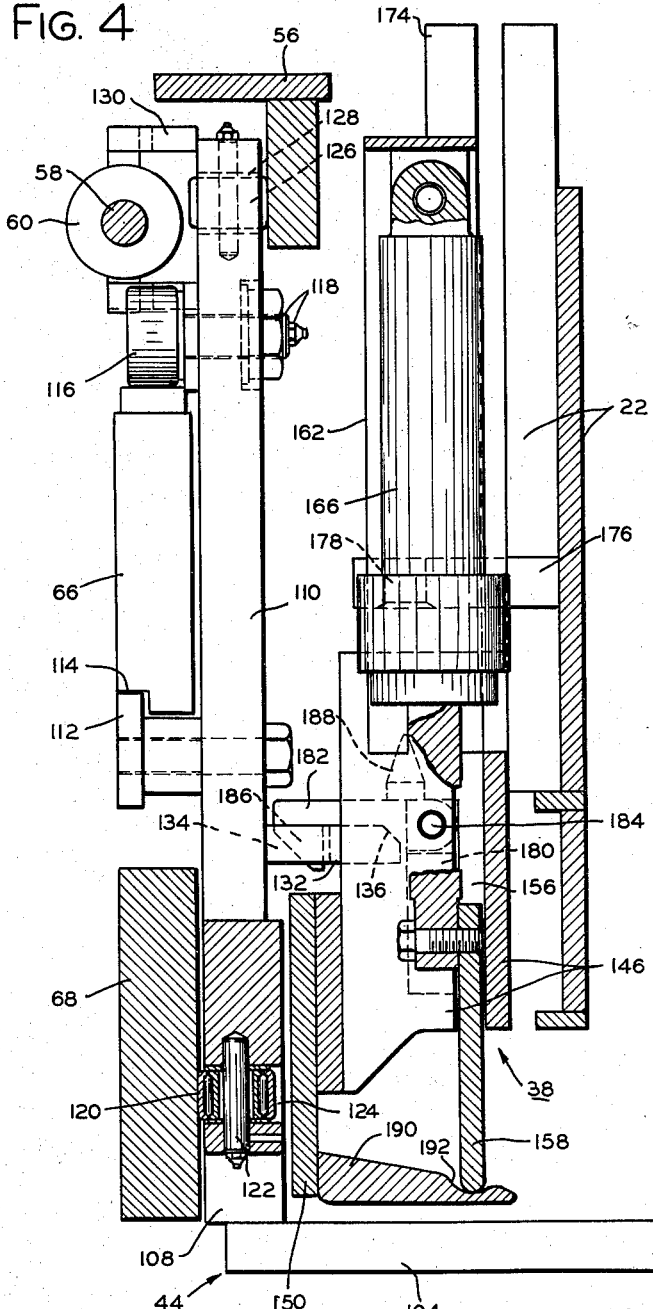
Figure 4 is a partial sectional view taken along line 4—4 of Figure 3.
Figure 5:
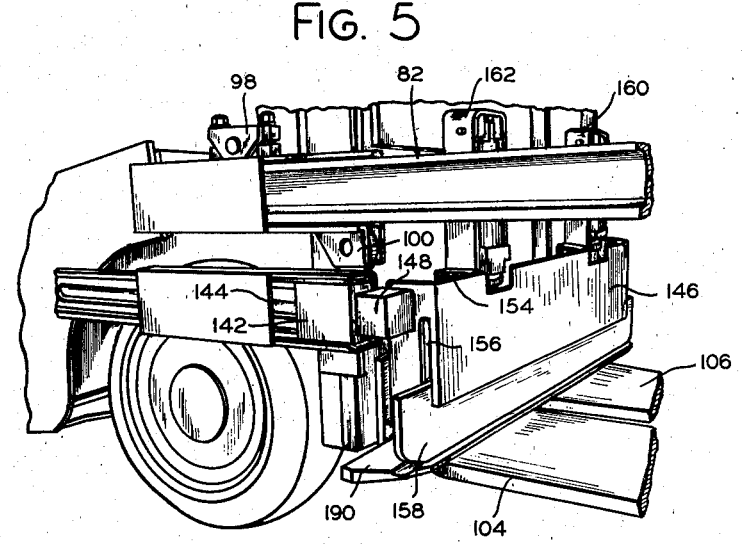
Figure 5 is a perspective view of a portion of the front end of the truck with our device attached thereto and showing clamping means thereof in a retracted position and pusher means thereof extended.
Figure 6:
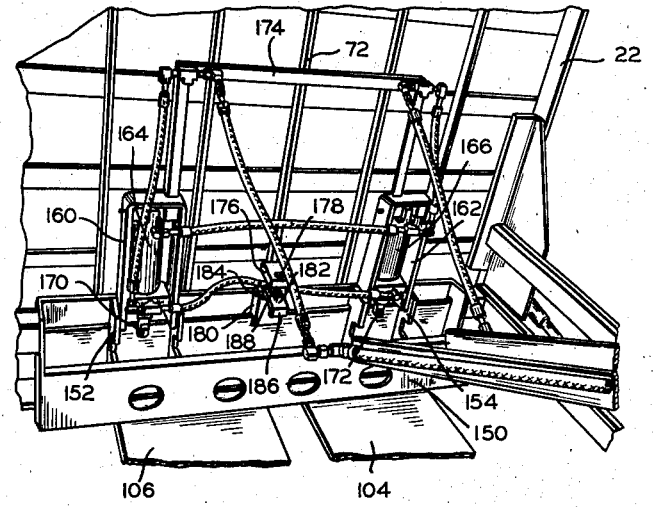
Figure 6 is a perspective view taken from the rear of our device showing the clamping means and load pusher means thereof in extended position.

The supporting framework 18 of the device 16 comprises a pair of vertically extending rigid members 50 and 52 which are maintained in spaced relation, as shown, by means of a horizontally extending plate 54, a slightly forwardly displaced inverted L-shaped member 56, the transverse shaft member 34, which is mounted for rotational movement in bearings adjacent the upper ends of members 50 and 52, a transversely extending fixed piston rod 58 of a laterally movable hydraulic cylinder assembly 60, and, primarily, by a pair of vertically spaced and transversely extending coplanar mounting plates or carriage means 66 and 68 (Figure 4). The carriage means 66, 68 are secured, as by welding, along the side edges thereof to the inner sides of members 50 and 52. The carriage is also fixedly connected to lift brackets, not shown, of well known type, by means of vertically spaced sets of bolts 62 and 64 (Figure 3). The lift brackets are mounted in the lifting mast 10 for vertical movement therein, which, as will be hereinafter more fully understood, effects corresponding vertical movement of the entire device 16.

The rack 22 of the load pusher assembly 20 comprises a lattice-work of horizontally and vertically extending members 70 and 72 which are bounded and supported by a generally square frame 74. A pair of side plate members 76 are connected to the side members of the frame 74 and extend rearwardly therefrom, being rigidly attached to a pair of inner slide members 78 of the telescoping channel assemblies 24 and 26 and to a pair of adjustable rod members 80 which have pivotal connection with the plate members 76 and with the one ends of rotatable crank arms 30 and 32.

The channel members 78 are slidable within intermediate channelled slide members 82 which are also connected to the center portion of crank arms 30 and 32 by means of a pair of brackets 84 and a pair of adjustable pivot rods 86. The channel members 82 are slidable longitudinally within a pair of fixed outer channelled members 88 which are fixedly connected to the side members 50 of the supporting framework 18 by means of plates 90.

The lower ends of cylinder assemblies 36 are pivotally connected to a pair of rearwardly extending brackets 92, which brackets are fixed, as by welding, to the members 50 and 52, the piston rods of said cylinder assemblies being pivotally connected to a pair of cranks 94 which are secured at their opposite ends to the opposite ends of shaft 34 by means of yokes 96.

Figure 1:
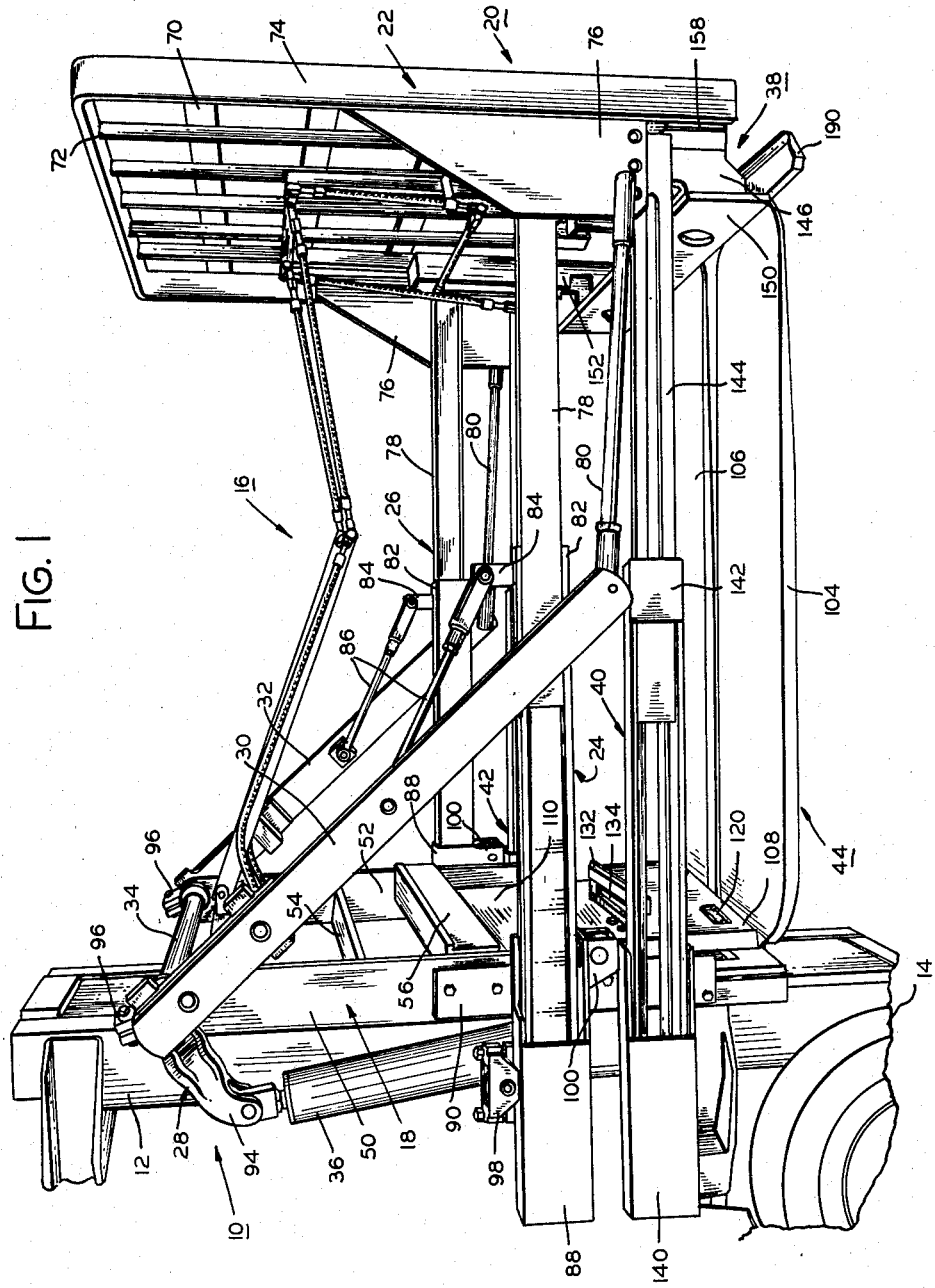
Figure 1 is a perspective view of the device of our invention mounted upon a lifting or upright mast portion of an industrial truck, and shown in extended position.
Figure 2:
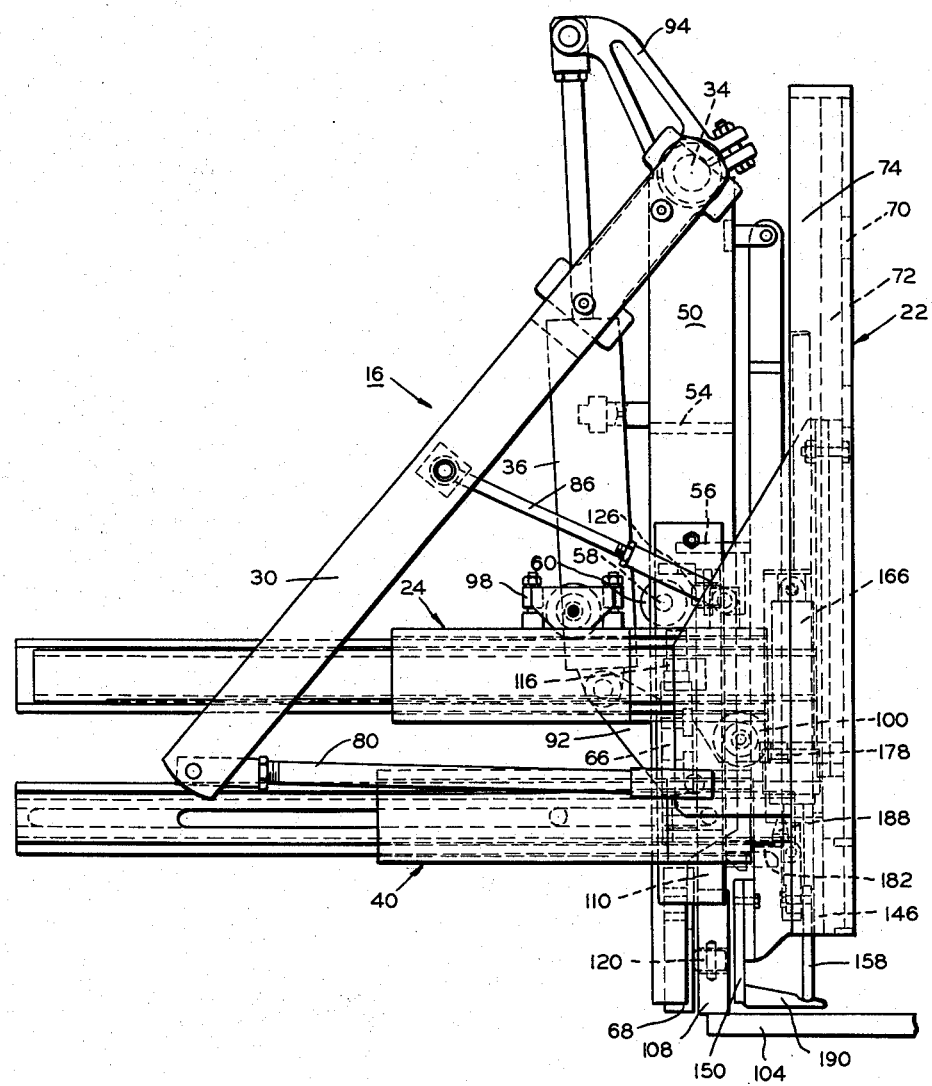
Figure 2 is a side elevational view of the device which is shown in Figure 1, but in retracted position.

Energization of cylinder assemblies 36, in order to effect extension of the piston rods thereof from the position shown in Figure 1 toward the position shown in Figure 2, acts through the crank assemblies 28, which include cranks 94, shaft 34, crank arms 30 and 32 and rods 80 and 86, to actuate the load pusher assembly 20 rearwardly as the crank arms 30 and 32 rotate with shaft 34 to effect an inwardly telescoping movement of the channel members of channel assemblies 24 and 26. When the pusher assembly 20 is in a fully retracted position, as shown in Figure 2, the rack 22 is spaced forwardly from the supporting framework 18 only by the width of the clamping means 38.

As will be apparent from Figures 1 and 2, the inner slides 78 move with the rack 22 approximately twice the distance of the intermediate slides 82, whereby the rods 80 are connected adjacent the outer ends of crank arms 30 and 32 and are approximately twice the length of connecting rods 86, which are connected in the center portions of crank arms 30 and 32. Each intermediate slide member 82 is spaced from the sides of the fixed channel members 88 by means of upper and lower roller assemblies 98 and 100 which are mounted in longitudinally spaced relation by means of brackets fixed to the channel members 88, said sides of the members 88 have openings therein for permitting the rollers of said roller assemblies to engage the sides of the intermediate slides 82, as shown, whereby only rolling friction between the outer and intermediate slides is encountered.

The laterally movable portion of the load supporting assembly 44 comprises a pair of transversely spaced and forwardly extending platens 104 and 106 secured, as by welding, to the bottom edge of a transversely extending plate member 108 which is in turn secured along the upper edge thereof to the bottom edge of a transversely extending side shifting plate member 110, best shown in Figure 4; plate member 110 is mounted with the platens 104 and 106 for side shifting movement in either direction within the confines of members 50 and 52 of the supporting framework 18 of assembly 44. The plate member 110 is mounted upon the supporting or carriage plate 66 by means of a pair of rearwardly extending and laterally spaced brackets 112, one of which is shown in Figure 4, which are adapted to register with a notched corner 114 of said carriage plate, and by a pair of laterally spaced rollers 116, one of which is shown, connected to the plate member 110, as by bolt and shaft means 118, and adapted to support said plate member in relative rolling engagement with the upper edge of carriage member 66. In addition to the rollers 116, a pair of laterally spaced rollers 120, one of which is shown, are each mounted within an opening 124 in transverse plate member 108 upon a shaft 122 to rotate in a plane transverse to the plane of rotation of rollers 116 for rolling engagement with the forward surface of carriage member 68, whereby to effect a slight separation between adjacent surfaces of members 66 and 68 and side shifting plates 108 and 110. In addition, the plate member 110 is mounted in relative rolling engagement with the downwardly depending leg of inverted L-shaped member 56 by means of a pair of laterally spaced rollers 126, each of which is mounted in an opening 128 adjacent the upper edge of plate 110 in a manner similar to the mounting of rollers 120 in openings 124. The rollers 126 extend through the opening to engage the rear surface of said leg of member 56.

It will now be seen that the movable portion of the load supporting assembly 44 is held against vertical movement relative to carriage 66, 68 by means of rollers 116 and brackets 112, and is held against tilting movement relative to said carriage by means of rollers 120 and 126. Since members 68 and 56 comprise fixed portions of the framework 18 of the attachment, they together provide a resistance couple to a downward load upon the members 104 and 106, which couple is ultimately provided by the lifting mast 12 through the lift brackets. A vertical force component of load acts through rollers 116 and carriage 66, 68, and is ultimately resisted by an hydraulic hoist in lifting mast 12.

The side shift cylinder 60 has secured at the center portion thereof a yoke assembly 130 which is also secured to the rear surface of plate member 110. As pointed out hereinbefore, the piston rod 58 is fixed at its opposite ends to the laterally spaced frame members 50 and 52. A fixed piston, not shown, is centrally mounted on rod 58 such that the introduction of pressure fluid to either end of cylinder 60 effects a movement of the cylinder to the right or to the left along piston rod 58, and consequent like movement of the connected portion of load supporting assembly 44 relative to the other parts of the attachment 16. The extent of available lateral movement of the movable portion of load supporting assembly 44 to the right or to the left of a centered position is limited by the position of abutment between an outer edge of plate member 108 and the adjacent inner edge of frame member 50 or 52. The extent of side shift is a matter of design and may be selected as desired.

Mounted upon the forward surface of plate member 110 is a forwardly and transversely extending member 132 having a transversely extending slot 134 in the rear portion thereof and a chamfered edge 136 at the forward edge thereof. The member 132 is adapted to be engaged by a latch or dog member of the jaw and jaw frame assembly 38, in a manner to be described, for retaining said assembly adjacent the framework 18 under certain conditions.

Referring now to Figures 1, 4, 5 and 6, which best illustrate the construction of the clamping means or jaw and jaw frame assembly 38, the lower telescoping channel assemblies 40 and 42 are similar in construction to channel assemblies 24 and 26, and each comprises an outer fixed member 140, which is securely attached by plate members 90 to one of the frame members 50 or 52, an intermediate channel member 142 slidable within the member 140, and an inner slide member 144 slidable within member 142 and securely attached, as by welding, at the outer end thereof to a rearwardly opening generally U-shaped jaw frame member 146 by means of a block 148 which is connected between the outer end of each inner slide and the rear portion of each of the legs of frame member 146. The inner ends of the legs of member 146 are connected together by means of a transversely extending perforated strengthening plate member 150. Intermediate the legs of member 146 are two pairs of asymmetrical members 152 and 154 which are transversely spaced on opposite sides of the center section of the frame member 146 and which are rigidly connected between the plate member 150 and the forward connecting part of frame member 146. The legs of frame member 146 and each of the pairs of members 152 and 154 are formed to provide a vertically extending and transversely aligned slot 156 which receives a transversely extending reciprocable clamping or jaw blade 158. Connected between the pair of members 152 is an inverted U-shaped member 160, and connected between the pair of members 154 is an inverted U-shaped member 162. Hydraulic cylinder assemblies 164 and 166 are each pivotally mounted on a transverse pin which extends between the legs of inverted U-shaped members 160 and 162, respectively, adjacent the upper ends thereof. The piston rods of cylinder assemblies 164 and 166 are connected to jaw blade 158 adjacent the upper edge thereof at 170 and 172, respectively. Another inverted U-shaped frame member 174 is connected between the tops of inverted U-shaped members 160 and 162, as shown. Member 174, the pairs of asymmetrical members 152 and 154, and the transverse connecting member 150 all aid in rigidifying the jaw frame assembly. A horizontal and transversely extending jaw shoe 190 is secured, as by welding, along and adjacent to the lower transverse edge of perforated plate member 150 and is tapered forwardly from its connection with said plate member, as shown. Adjacent the forward edge thereof there is formed in the upper surface a transverse groove 192 which is adapted to receive therein the lower curved edge of jaw blade 158. The jaw shoe 190 is the lowermost member of the jaw and jaw frame assembly and is disposed just above the upper surfaces of platens 104 and 106.

An element 176 is secured to and extends rearwardly from one of the vertical ribs 72 of the pusher rack 22. The element 176 is preferably centrally located on the vertical axis of the rack at a position adjacent the bottom thereof, and contains a vertically extending opening 78 therein.

Immediately below the element 176 (Figure 6) and connected to and extending upwardly from the upper edge of jaw blade 158 is an upwardly opening U-shaped mounting element 180, between the legs of which is pivotally mounted on a transverse pivot pin 184 a dog or latch member 182. The latch 182, as shown, is gravity loaded on pin 184 toward a horizontal position but may be spring loaded, if desired. The after end of latch member 182 comprises a downwardly depending leg 186 which has the rear face thereof formed at an angle equal to the angle of the chamfered edge 136 of member 132. Secured to the upper surface of latch 182 adjacent pin 184 is an upwardly extending needle-like pin 188 which is located so as to be registrable with opening 178 of element 176 whenever the cylinder assemblies 164 and 166 are energized to actuate upwardly jaw blade 158 in slot 156. Since the element 176 is connected to the rack 22 and the latch assembly 180, 182 is secured to the jaw blade 158, said jaw being in turn effectively secured by means of cylinder assemblies 164 and 166 and associated frame members to the jaw frame assembly, it will be apparent that upward movement of the jaw blade 158 in slot 156 will effect a positive connection between the clamping means 38 and the load pusher assembly 20 as a result of the registry of connecting pin 188 in opening 178.

It will now be apparent that whenever the jaw blade 158 is in its up position in slot 156 the entire jaw and jaw frame assembly 38 becomes, in effect, a part of the load pusher assembly 20, and will, therefore, move outwardly toward the forward end of platens 104 and 106 with the pusher assembly 20 upon retraction of cylinder assemblies 36, as shown in Figure 1. If, at the position shown in Figure 1, the jaw blade 158 is actuated downwardly in slot 156 so as to disengage the pin 188 from the opening 178, then the entire jaw and jaw frame assembly 38 is disconnected from the pusher assembly 20. However, extension of the cylinder assemblies 36 from the position shown in Figure 1 to that of Figure 2 will effect rearward movement of the assembly 38 along with the assembly 20 as a result of abutment between the front surface of frame member 146 and the back side of rack 22. As the rack 22 approaches its rearwardmost position, as shown in Figure 2, the downwardly depending leg 186 of latch 182 engages the forward chamfered edge of member 132 which causes the latch to pivot upwardly about pin 184 and then slide rearwardly along the upper surface of member 132 until the spring loading of the latch causes the leg 186 to fall into slot 134. Therefore, whenever the jaw and jaw frame assembly 38 is in its rearward position and the jaw blade 158 is down the position of said assembly is fixed with respect to the load supporting assembly 44. So long as the jaw is maintained in its downward position the assembly 38 will remain in the position shown in Figure 5, for example, while the load pusher assembly 20 may be actuated forwardly and rearwardly relative to the rest of the attachment 16. If, on the other hand, when the assemblies 20 and 38 are in the relative positions shown in Figure 2, the jaw blade 158 is actuated upwardly to connect assembly 38 with assembly 20, subsequent full retraction of cylinder assemblies 36 will effect unitary outward movement of said assemblies to the position shown in Figure 1.

Referring now to Figure 7, there is illustrated a schematized plan view of hydraulic control means for operating the load pusher assembly 20, the side shifting portion of the load supporting assembly 44, and jaw blade 158. A control lever bank 200 is conveniently located in the operator's compartment for convenient selective control of the various fluid pressure actuated parts and assemblies. The bank of control levers receives pressure fluid from the discharge side of a pump, not shown, through a conduit 201 and is adapted to discharge all or a part of said fluid through a conduit 203 to a pump supply sump, not shown.

A lever 202 controls the pusher assembly cylinders 36. If actuated to the position marked B, pressure fluid will flow from conduit 201 to cylinders 36 by way of a line 204, a mounting block 206, which is mounted atop the inner slide of the lifting mast structure 12 for connecting various ones of the lines, and lines 208 and 210 for extending the piston rods of said cylinders to retract the pusher assembly 20. Movement of lever 202 to position F directs pressure fluid to the forward ends of cylinders 36 through a line 212, a mounting block 214, and lines 216 and 218 to extend the assembly 20.

A lever 220 may be actuated to position R to introduce pressure fluid from line 201 to the right hand end of side shift cylinder 60 through line 222, block 206 and line 224 for shifting cylinder 60 rightwardly along stationary piston rod 58. If the lever 220 is actuated to position L fluid enters the other end of cylinder 60 through line 226, block 214 and line 228 to shift said cylinder leftwardly along the piston rod. Shifting of the cylinder 60 to the right or to the left actuates, as hereinbefore described, the movable portion of the load supporting assembly 44 rightwardly or leftwardly, respectively, within the framework portion 18 thereof.

A lever 230 may be actuated forwardly to position C for permitting the flow of pressure fluid to the lower ends of jaw blade cylinders 164 and 166 through line 232, junction 234, line 236, the block 206 and line 238 to actuate the jaw blade downwardly to closed position. If the lever 230 is actuated to the position marked O, fluid will flow to the bottom ends of cylinders 164 and 166 to open the jaw blade 158 through line 240, junctions 242 and 244, line 246, the block 214, and line 248.

A tilt control lever 250 is provided for initiating fore and aft tilt of the attachment 16 with the mast assembly 12 about the front axle by cylinder means, not shown, and a lift control lever 252 is provided for initiating raising and lowering movements of the attachment on the mast by means of a well known hoist cylinder assembly, not shown.

Whenever any one of the hydraulic cylinders which is controlled by any of levers 202, 220 or 230 is actuated in one direction, fluid from the opposite end of any such cylinder will be discharged to the sump through line 203 and that end of the respective valve in the lever bank which is opposite to the lever position selected. For example, if shift cylinder 60 is actuated rightwardly by introducing pressure fluid to the right end thereof, fluid in the left end will be discharged back through lines 228 and 226 through that end of the valve indicated by the position marked L, and thence through the control lever block line 203 to the sump. Similarly, fluid will be discharged through the control lever block 200 and line 203 to the sump from those ends of cylinders 36, and 164 and 166 which are opposite to the ends into which pressurized fluid is introduced. If any one of the levers in the control bank 200 is located in a neutral position fluid will not flow to either end of the cylinder assembly controlled thereby, which will remain in its selected position.

Four spring loaded ball check valves 254, 256, 258 and 260 are provided to come into operation in a sequence to be described in the event that the side shift lever 220 is actuated to either of its active positions while the jaw blade 158 is down. The various pilot valves are connected in the hydraulic circuits of cylinder 60 and cylinders 164 and 166 in such a manner that the jaw blade will be automatically raised whenever side shift lever 220 is actuated out of its neutral position. The reason for this interrelationship between shift cylinder 60 and cylinders 164 and 166 will become apparent later on in the description of operation.

The pilot valve 254 is connected at its opposite ends by lines 262 and 264 to junction 234 and 244, respectively, and to the sump by line 266. One end of the valve 258 is connected by line 268 to a line 270, which is connected directly to pump discharge line 201, while the opposite end of valve 258 is connected to line 226 by line 272, and the central portion of said valve is connected to the central portion of valve 256 by lines 274 and 278.

The valve 260 is connected at the one end thereof to pump discharge pressure line 270 and at the opposite end to line 222 by a line 276.

Valve 256, in addition to being connected to the central portions of valves 258 and 260 by way of the lines 274 and 278, is also connected at the one end thereof to junction 242 by a line 280.

The legend P on each of the pilot valves indicates that end thereof at which each ball check valve, not shown, is seated by a spring which urges each ball valve toward each end marked P. In operation, the valve 258, for example, is opened by fluid pressure in the line 272 to permit fluid at pump discharge pressure to flow from line 270 through line 268, the then open valve 258 and line 274 so as to open pilot valve 256 against the spring pressure thereof and thence flow through line 280, junctions 242 and 244 and lines 246 and 248 to jaw blade cylinders 164 and 166 to open same, if closed. Any excess fluid from line 280 flows through pilot valve 254 to the sump through line 266. It will now be seen that pressure fluid in line 264 will open pilot valve 254; pressure fluid in line 272 will open valve 258; pressure fluid in line 276 will open valve 260; and pressure fluid in line 274 will open valve 256.

Assume now that the jaw blade 158 is closed and that its control lever 230 is in a neutral position. Under such a condition if the shift lever 220 is actuated to position R to shift cylinder 60 and the movable portion of the load supporting assembly 44 rightwardly, the jaw blade 158 will be automatically opened by cylinders 164 and 166 in the following way: When lever 220 is in position R pressure fluid flows not only to the right end of cylinder 60 but also through line 276 to open pilot valve 260, thereby permitting pump discharge fluid to flow through line 270, pilot valve 260, line 278, line 274, pilot valve 256, line 280, junctions 242 and 244, and lines 246 and 248 to cylinders 164 and 166 to open same, any excess fluid flowing through line 264, pilot valve 254 and line 266 to the sump. Since the jaw control lever 230 is in neutral position fluid from the upper ends of cylinders 164 and 166 cannot flow through the control block 200 to line 203 and the sump, but will flow instead through line 238, block 206, line 236, line 262, the now open pilot valve 254 and line 266 to the sump, thereby permitting the aforesaid upward actuation of the jaw blade.

If, under the aforesaid conditions, the side shift lever 220 is actuated to position L to shift cylinder 60 and assembly 44 leftwardly, a portion of the flow to the left end of cylinder 60 will flow through junction 232 and line 272 to open valve 258, thereby permitting pump pressure fluid to flow through the lines 270 and 268 to line 274, and thence through now open valve 256, line 280, junctions 242 and 244, and lines 246 and 248 to the lower ends of cylinders 164 and 166 to open the jaw blade. In the same manner as previously, the fluid discharge from the upper ends of cylinders 164 and 166 upon opening movement of the jaw blade will flow through lines 238 and 236 to now open valve 254 and thence to the pump sump through line 266.

In both of the above examples the discharge of fluid from the low pressure end of cylinder 60 will flow through the side shift valve controlled by lever 220 by way of lines 224 and 222 when the cylinder is shifted leftwardly, and by way of lines 228 and 226 when the cylinder is shifted rightwardly.

Referring now to Figures 8, 9, 10, and 11, there is illustrated a typical operating sequence of the device of our invention. In Figure 8 is illustrated the normal inactive position of our device in which no load is carried by the load supporting assembly 44. In the position of the device as here shown, the load pusher assembly 20 is positioned adjacent the clamping means 38, and said clamping means is positioned adjacent the vertical portion of assembly 44, the blade 158 being in its up position in which it is detached from member 132 of assembly 44 and attached to member 176 of assembly 20 by pin 188.

If the truck operator now desires to mount a load upon platens 104 and 106 he first drives the truck to a position adjacent one side of the load 290, which has previously been unitized upon a flexible pallet 292 of well known type, one edge of which pallet preferably projects slightly upwardly and outwardly from said side of the load. If the truck is not aligned as desired to pick up the load on the platens 104 and 106, cylinder 60 may be energized in the previously described manner to shift the movable portion of load supporting assembly 44 either to the right or left for proper alignment. Control lever 202 is then actuated to position F which causes the piston rods of cylinders 36 to retract and actuate the crank assembly 28 outwardly toward the load which effects concurrent outward movement of the load pusher and clamping assemblies 20 and 38. With the load platens 104 and 106 flat on the floor and the attachment positioned as shown in Figure 9, the cylinders 164 and 166 are energized to actuate jaw blade 158 downwardly into holding engagement with the groove 192 in shoe 190, thereby gripping intermediate the jaw blade and shoe the outwardly extending edge 294 of pallet 292. Subsequent opposite energization of cylinder assemblies 36 effects a rearward movement of the load pusher and clamping assemblies to the position illustrated in Figure 10, in which the load 290 has been drawn onto the platens 104 and 106 with the pallet 292 as a result of the gripping action between the jaw blade and shoe on edge 294 of the pallet. As previously described the assembly 38 becomes attached to the load supporting assembly 44 by means of latch 182 and slotted member 132 whenever the clamping assembly is positioned adjacent the load supporting assembly and the jaw 158 is down.

With the load 290 now fully engaged by platens 104 and 106, it can be transported by the truck to any location desired, lifted to any desired elevation within the range of lifting mast 12, and tilted forwardly or rearwardly with the attachment 16 and the mast 12 for aiding unloading or transport thereof, respectively. When the truck has been driven to the location desired for unloading, the operator may elect whether to discharge the load and pallet 290 and 292 together or to separate the load 290 from the pallet 292 by retaining the pallet on the platens and discharging the load therefrom. In many cases, the operator will elect to retain the pallet on the load platens so it can be subsequently used. If the operator decides to retain the pallet while discharging the load he simply allows the jaw blade 158 to remain in its down position and energizes cylinder assemblies 36 to actuate the crank assembly 28 and pusher rack assembly 20 outwardly to the position shown in Figure 11, in which the load 290 has been pushed off of the pallet 292 by the now extended load pusher assembly, said pallet being retained upon the load platens by the clamping assembly 38 which remains secured to the load supporting assembly 44 as aforesaid. From the position illustrated in Figure 11 the load pusher and clamping assemblies may be returned to the positions shown in Figure 8, in which the attachment is ready for another loading and unloading operation as above described.

Figure 10:
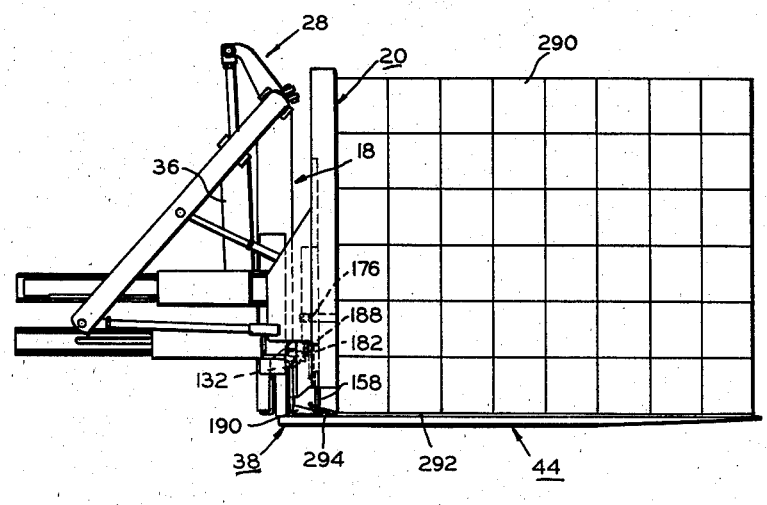
Figure 11:
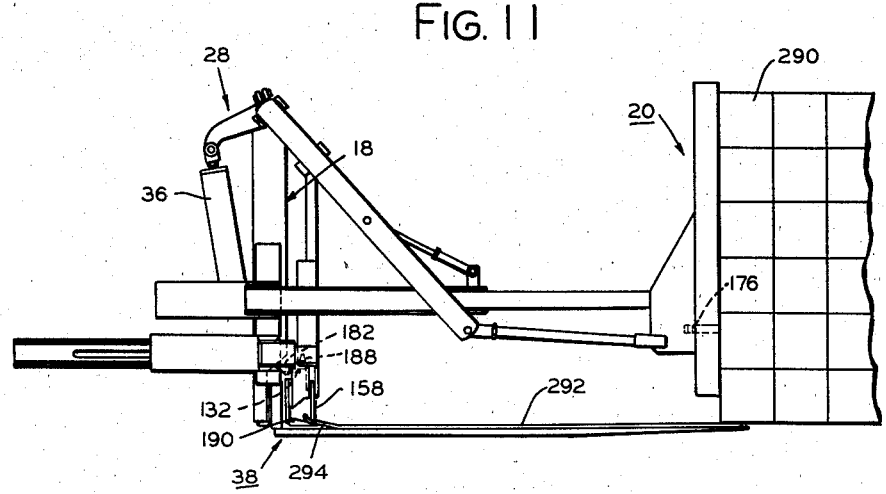

In the event that it is not desired to separate the load from the pallet as in Figure 11, the jaw blade 158 may be raised in Figure 10 to disengage same from assembly 44 and engage same with assembly 20 (Figure 8), thereby releasing the marginal edge 294 of the pallet, following which pusher assembly 20 and clamping assembly 38 may be operated together in known manner to discharge the load and pallet from the platens. The latter mode of operation may be desirable in the case where it is desired to later pick up and transport the same load to another location, in which case the load 290 remains unitized upon the pallet 292 for subsequent transport by the device of our invention.

It will be understood that the upper surfaces of load platens 104 and 106 are polished so as to minimize the coefficient of friction between said platens and the lower surface of pallet 292, such that the load 290 always remains with the pallet 292 unless movement of the pallet is inhibited by the clamping assembly 38.

Now it will be understood that if a side shifting operation of the movable portion of load supporting assembly 44 could be accomplished while the jaw blade 158 is in engagement with the shoe 190 and edge 294 of the pallet, a tearing of the pallet would occur at the edge 294 thereof, which would destroy it for further use. Such attempted side shifting with the jaw blade down may naturally occur either following initial engagement of the pallet by the jaw blade preparatory to loading same upon the load platens, as shown in Figure 9, or preparatory to or during an unloading operation as shown in Figures 10 and 11. The hydraulic control circuitry of Figure 7 prevents the possibility of side shifting while the blade 158 is down. It will be recalled that the hydraulic control circuit is so arranged that the jaw blade cylinders 164 and 166 will automatically actuate blade 158 from a down to an up position thereby releasing any pallet engaged thereby, if an attempt is made to shift cylinder 60 in either direction while said blade is down.

In Figures 12, 13, 14 and 15 there is illustrated a modified arrangement of the mechanism for alternately locking the jaw and jaw frame assembly 38 to either the load supporting assembly 44 or the load pusher assembly 20. Like parts have been numbered similarly to corresponding parts in the preferred embodiment of our invention, which has been described above. Except for the latching mechanism of jaw assembly 38, the device of this second embodiment of our invention is essentially the same as the first described device.

In this modified arrangement two similar jaw latching mechanisms are utilized, one at each side of the device 16. Corresponding parts of the two latching mechanisms are identified by like numbers.

A short channel member 300 is rigidly secured to each side of the fixed portion of load supporting assembly 44. An upwardly extending opening 302 is formed through a boss 304 of each member 300 and a pin member 306 is pivotally mounted at 308 on the after end of a bell crank latching mechanism 310 for reciprocating movement in opening 302 as the bell crank 310 is actuated about a frame connected pivot pin 312 between the positions shown in Figure 14 and 15. A guided spring 314 is connected between the lower surface of channel 300 and the upper edge of bell crank 310 for urging the bell crank and pin to the position shown in Figure 14.

A short jaw slide channel 316 is secured at its forward end to each leg of jaw frame member 146 and is slidable inwardly and outwardly of channel member 300 with the jaw and jaw frame assembly 38. A rack slide bar 318 is secured to each of side plate members 76 of rack 22 and is slidable outwardly and inwardly relative to jaw slide channel 316 and fixed channel member 300 with the load pusher assembly 20. A rearwardly extending bracket member 320 is secured adjacent each side of jaw blade 158 and is slotted to receive securing bolts 322 of camming members 324 from the upper edge of each of which projects upwardly a locking pin 326. An opening 328 is formed in the lower leg of jaw slide channel 316 while an opening 330 extends upwardly in the rack slide bar 318. It will be noted that both the channel 316 and the slide bar 318 extend forwardly beyond channel 300. Whenever the load pusher and clamping assemblies are retracted fully opening 328 is axially aligned with opening 300, and locking pin 326 is axially aligned with both said openings.

If jaw blade 158 is actuated upwardly by cylinders 164 and 166 from the down position shown in Figure 14 to the up position shown in Figure 15 each of locking pins 326 will pass through each of openings 328 and into each of openings 330 in the channel members 316 and the slide bars 318, respectively, as shown in Figure 15. When the jaw blade is in the up position it is apparent that the clamping assembly 38 is positively locked to the load pusher assembly 20 by means of locking pin 326 which connects the jaw slide 316 to the rack slide bar 318. When the jaw blade is down the load pusher assembly may be actuated independently of the clamping assembly, said clamping assembly being secured to the load supporting assembly 44 by means of pin 306, which passes through opening 302 in channel member 300, as aforementioned, and which also projects into an aligned opening 332 (Figure 12) formed in the lower leg of channel 316 rearwardly of the opening 328 thereof. It will therefore be seen that the clamping assembly may be positively secured to the load supporting assembly by the registry of pin 306 in both of openings 302 and 332 in channels 300 and 316, respectively.

As will be readily seen from Figures 14 and 15, the forward and rearward edges of bell crank 310 and camming member 324 are formed for mating engagement when the jaw blade is actuated upwardly so that as the locking pin 326 latches the clamping assembly to the load pusher assembly (Figure 15) it simultaneously disengages the jaw frame assembly from the load supporting assembly by actuating bell crank 310 upwardly at its forward end about pin 312 to compress spring 314 and disengage pin 306 from the opening 332 in channel 316.

The mode of operation of this modified arrangement is the same as that described with reference to Figures 7–11.

From the foregoing it will be apparent that we have provided an improved mechanism for handling loads which are unitized on preferably flexible pallets, whereby such loads may be automatically loaded for transport to and discharge at a remote destination, our device being controllable automatically to either discharge the pallet with said load or retain said pallet while separating the load therefrom, as selected by the operator, and that, further, there is provided improved hydraulic control means for insuring against damage to or destruction of the pallet during load positioning movement of the load supporting means in a lateral direction.

Although only two embodiments of our invention have been described in detail, it will be apparent to persons skilled in the art that numerous changes might be made in the construction, form and arrangement of the parts without departing from the scope of the invention.

We claim:

1. In combination, load support means including an elongated load suppor member, load engaging means actuatable longitudinally of and above the load support member and including load pusher means and clamping means, said clamping means being adapted to grip a sheet-like pallet having a load thereon to draw it onto said load support member, coupling means connected to said clamping means and operable remotely to secure said clamping means to either said load pusher means or to said load support means, said load support member being mounted for movement transversely of the load engaging means, and automatically operable control means operatively connected to the clamping means for causing same to release its grip on said pallet whenever said load support member is actuated transversely of the load engaging means.

2. In combination, load support means, load pusher means adjacent the load support means and movable in extension and retraction, retractable clamping means intermediate the load pusher means and the load support means and adapted to grip a sheet-like pallet having a load thereon to draw it onto said load support means, and coupling means connected to said load support means, said load pusher means and said clamping means and operable remotely in such a manner that said clamping means is connectible to said load pusher means for retraction therewith and is connectible to said load support means when in a retracted position.

3. In a load handling device for an industrial truck, first means secured to the truck for supporting a load, second means movable in extension and retraction longitudinally of said first means for discharging a load therefrom, third means movable in extension and retraction longitudinally of said first means for gripping a sheet-like pallet having a load thereon to draw it onto said first means, and fourth means associated with said first, second and third means and operable remotely for selectively causing said third means to move in extension with said second means or to be connected in retracted position with said first means during extending movement of said second means.

4. An attachment for an industrial truck having an upright mast structure mounted at one end thereof and means vertically movable on said mast structure comprising load support means extending forwardly from said truck and supported upon said vertically movable means, first load engaging means movable longitudinally of said forwardly extending load support means for discharging a load therefrom, forwardly projecting power driven extensible means mounted adjacent opposite sides of said load support means and connected to opposite sides of said first load engaging means, second load engaging means disposed generally intermediate of said first load engaging means and said load support means and connectible with said first load engaging means for longitudinal movement therewith, said second load engaging means being adapted to engage a load and pull same onto said load support means, said second load engaging means being operable remotely to be detachable from the first load engaging means and securable to the load support means for permitting longitudinal movement of said first load engaging means independent of said second load engaging means.

5. A device as claimed in claim 4 wherein said second load engaging means is mounted adjacent the end of second extensible means which is supported by the load support means and includes a vertically movable jaw member, whereby movement of said first load engaging means independently of said second load engaging means, as aforesaid, effects extending movement of said first extensible means while said second extensible means remains in retracted position.

6. A mechanism as claimed in claim 4 wherein the device for alternately connecting the second load engaging means to the first load engaging means and to the load support means comprises latch means connected to the movable jaw member for vertical movement therewith, said device being so constructed and arranged that upward movement of the jaw member effects a connection of the second load engaging means to the first load engaging means while downward movement of said jaw member positions the device for locking engagement with said load support means.

7. A device as claimed in claim 4 wherein a portion of the load support means is mounted for lateral movement relative to another portion of the load support means, and means are provided for so actuating said first portion of said load support means.

8. A mechanism as claimed in claim 6 plus means mounting a portion of the load support means so as to permit lateral movement thereof, plus automatically operable control means connected to the second load engaging means for effecting upward movement of said jaw member whenever said portion of the load support means is actuated laterally.

9. An attachment for an industrial truck having load support means mounted for vertical movement at the forward end thereof and extending forwardly therefrom, comprising vertically extending rack means adjacent the load support means, power actuated means carried by the support means for extending the rack means longitudinally of the support means, a jaw and jaw frame intermediate said rack and said support means including power means for actuating said jaw vertically in said jaw frame whereby to grip a sheet-like pallet having a load thereon to draw it onto said support means and latch means connected to the jaw and movable therewith, means cooperable with the latch means and connected to the rack, and means cooperable with the latch means and connected to the support means, said latch means being adapted to lock the jaw and jaw frame to the first cooperable means and to the rack when said jaw is actuated upwardly and to lock the jaw and jaw frame to the support means when said jaw is actuated downwardly, said jaw and jaw frame being movable longitudinally with the rack when locked thereto by said latch means.

10. In a load handling device for an industrial truck, first means secured to the truck for supporting a load, second means movable longitudinally of said first means for discharging a load therefrom, third means also movable longitudinally in extension and retraction relative to said first means for gripping a sheet-like pallet having a load thereon to draw it on to said first means, and fourth means associated with said first, second and third means for alternately securing said third means to said first and second means as desired, said third means including an actuatable clamping member to which a portion of said fourth means is secured to effect a connection between said second and third means when the clamping member is actuated upwardly and to effect a connection between said first and third means when said clamping member is retracted and is actuated downwardly.

11. An attachment as claimed in claim 10 wherein said second and third means may first be connected by said fourth means for simultaneous actuation forwardly of the truck, the clamping member of said third means may then be actuated downwardly to grip a pallet having a load thereon, said second and third means may then be together actuated rearwardly of said first means until said fourth means effects a connection between said third and first means, during which rearward movement said load and pallet are together drawn onto said first means, and said second means may then be actuated forwardly of said first means for discharging a load therefrom while said third means remains connected to said first means for retaining said pallet thereon.

12. A device for separating a load from a sheet-like pallet comprising a generally L-shaped platform means, pusher means operatively connected to said platform means and actuatable longitudinally thereof for discharging a load therefrom, clamping means intermediate said pusher means and platform means and selectively operable to be connected with said pusher means for longitudinal movement therewith and for gripping a portion of such a pallet adjacent the outer end of the platform means in such a manner that the pallet and load may be drawn onto the platform means by actuating said pusher means and clamping means rearwardly thereof, and means operatively connected to said platform means and said clamping means and operable remotely for disconnecting said clamping means from said pusher means and connecting said clamping means to said platform means, whereupon the sheet-like pallet is retained on said platform means by said clamping means during subsequent actuation of said pusher means forwardly of the platform means which effects a discharge of the load from the platform means and a separation of the load from the pallet.

13. A device as claimed in claim 12 wherein said clamping means includes a vertically movable jaw member and a latch means connected to said jaw member adapted to secure the clamping means to the pusher means when the jaw member is actuated vertically upwardly and to secure the clamping means to the platform means when the jaw member is actuated downwardly and said clamping means is positioned adjacent the vertical leg of the L-shaped platform.

14. A device as claimed in claim 13 wherein first hydraulic power means is provided for actuating said pusher means longitudinally of the platform means, second hydraulic means are provided for actuating said jaw member in a vertical direction, and extensible means mounted between said pusher means and said platform means are provided for guiding the movement of said pusher means during actuation thereof in either direction.

15. A device as claimed in claim 12 wherein control means are provided for selectively actuating the jaw member upwardly or downwardly in said clamping means for locking engagement with said pusher means or with said platform means, respectively, said latch means comprising an engageable member connected to said pusher means, an engageable member connected to the vertical leg of said platform and engaging means connected to the jaw which is registrable with the first mentioned engageable means when the jaw member is actuated upwardly and which is registrable wtih the last mentioned engageable means when the jaw member is actuated downwardly.

16. A device as claimed in claim 15 wherein the first mentioned engageable means comprises a member extending rearwardly from the pusher means and having an opening therein, the last mentioned engageable means comprises a member extending forwardly of the vertical leg of said platform and having an opening therein, and the engaging means comprises a latch member extending rearwardly from the jaw member and pivoted thereon and having an upwardly extending projection registrable with said first mentioned opening and a downwardly extending projection registrable with said second mentioned opening.

17. A device as claimed in claim 12 wherein said clamping means includes a vertically movable jaw member which is adapted to grip the edge of the pallet in said clamping means when actuated downwardly and to release said pallet from said clamping means when actuated upwardly, and latch means operatively connected to said jaw member and to the platform means such that upward actuation of the jaw member effects a simultaneous connection of said clamping means to said pusher means and disconnection of said clamping means from said platform means.

18. A device as claimed in claim 17 wherein telescoping members are connected to the pusher means, the clamping means and the platform means, the telescoping members connected to said pusher means and to said clamping means being securable together by that portion of the latch means connected to the jaw member when the jaw member is actuated upwardly, and the telescoping members connected to said clamping means and to said platform means being securable together by that portion of the latch means connected to the platform means when the jaw member is in its downward position.

19. A device as claimed in claim 18 wherein that portion of the latch means connected to the jaw member includes an upwardly extending projection which is registrable with alignable openings in the telescoping members connected to the pusher means and the clamping means, and that portion of the latch means connected to the platform means includes an upwardly projecting member which is registrable with alignable openings in the telescopic members connected to the clamping means and to the platform means.

20. A device as claimed in claim 12 wherein means are provided for shifting at least a portion of the platform means laterally of said pusher means and said clamping means, said clamping means including a vertically reciprocable jaw member for gripping the edge of a sheet-like pallet in said clamping means when actuated downwardly and for releasing same when actuated upwardly, and fluid control and power means for actuating the platform laterally and the jaw member vertically including means effecting releasing movement of the jaw member relative to said pallet whenever the fluid control means initiates lateral movement of the platform means when the jaw member is down or in gripping relation to said pallet.

21. A device as claimed in claim 20 wherein said fluid control and power means includes cylinder means for actuating the jaw member, cylinder means for actuating at least a portion of the platform means laterally of the clamping means, a first control lever controlling the introduction of pressure fluid to either end of the jaw member cylinder means, a second control lever controlling the introduction of pressure fluid to either end of the platform actuating cylinder means, valve means interconnecting the jaw member cylinder means and the platform actuating cylinder means and the control lever means in such a manner that pressure fluid is automatically introduced to one end of said jaw member cylinder means to effect raising movement of the jaw member whenever the platform control lever is actuated to shift the platform laterally, irrespective of the position of the jaw member control lever.

22. An attachment for an industrial truck having a vertically movable carriage mounted at one end thereof, comprising load platform means supported by the carriage, clamping means supported by said carriage and actuatable longitudinally of said load platform means, said clamping means including a vertically movable jaw member adapted to grip in the clamping means a sheet-like pallet having a load thereon to draw it onto the load platform means, means connected to the load platform means for shifting same transversely of the carriage and of the clamping means, and control means operatively interconnected between the load platform means and the jaw member for automatically actuating the jaw member in a dierction to release its grip on said pallet whenever lateral shifting movement of the load platform means is initiated.

23. An attachment as claimed in claim 22 wherein hydraulic cylinder means are provided for actuating the load platform means laterally of the carriage, hydraulic cylinder means are also provided for actuating the jaw member vertically in said clamping means, and control means for both said cylinder means are provided for energizing automatically said jaw member cylinder means to actuate the jaw member upwardly whenever said load platform cylinder means is energized to actuate the platform means laterally.

24. An attachment as claimed in claim 23 wherein a plurality of pilot valves are provided for operatively interconnecting the jaw member cylinder means with the load platform cylinder means whenever the control means is actuated to effect lateral movement of the load platform means while the jaw member is in its lowered position.

References Cited in the file of this patent
UNITED STATES PATENTS

| | | |
|---|---|---|
| 2,590,355 | Turner et al. | Mar. 25, 1952 |
| 2,619,241 | Jessen | Nov. 25, 1952 |
| 2,656,062 | Thomas | Oct. 20, 1953 |
| 2,663,443 | Schenkelberger | Dec. 22, 1953 |
| 2,672,249 | Ulinski | Mar. 16, 1954 |
| 2,795,346 | Farmer | June 11, 1957 |
| 2,832,487 | Oster et al. | Apr. 29, 1958 |

UNITED STATES PATENT OFFICE
CERTIFICATION OF CORRECTION

Patent No. 2,955,721                      October 11, 1960

Leon R. Hepler et al.

It is hereby certified that error appears in the above numbered patent requiring correction and that the said Letters Patent should read as corrected below.

Column 6, line 10, for "78" read -- 178 --; column 7, line 63, after "block" insert -- and --; column 11, line 68, for "suppor" read -- support --; column 14, line 27, for the claim reference numeral "12" read -- 13 --; lines 32 and 33, for "member", each occurrence, read -- means --; line 35, after "jaw" insert -- member --.

Signed and sealed this 25th day of April 1961.

(SEAL)
Attest:

ERNEST W. SWIDER                                             DAVID L. LADD
Attesting Officer                                              Commissioner of Patents